Sept. 15, 1964 C. L. HUBER ETAL 3,149,201

XEROGRAPHIC FACSIMILE SYSTEM

Filed Nov. 26, 1962

2 Sheets-Sheet 1

INVENTORS
CHARLES L. HUBER
JOHN L. WHEELER
ELLIOT H. WOODHULL
WILLIAM J. STOLZE

BY [signature]
ATTORNEY

Sept. 15, 1964 C. L. HUBER ETAL 3,149,201

XEROGRAPHIC FACSIMILE SYSTEM

Filed Nov. 26, 1962

2 Sheets-Sheet 2

INVENTORS
CHARLES L. HUBER
JOHN L. WHEELER
ELLIOT H. WOODHULL
WILLIAM J. STOLZE

BY [signature]
ATTORNEY 3,149,201

XEROGRAPHIC FACSIMILE SYSTEM

Charles L. Huber, Marion, John L. Wheeler, Webster, and Elliot H. Woodhull and William J. Stolze, Rochester, N.Y., assignors to Xerox Corporation, Rochester, N.Y., a corporation of New York Filed Nov. 26, 1962, Ser. No. 240,097
2 Claims. (Cl. 178—6.6)

This invention relates to facsimile transmission and receiving systems.

Specifically, this invention relates to a facsimile system wherein an original document is scanned by a light spot from a cathode ray tube, reflected light from the document scanned is translated into electrical picture signals by a photomultiplier tube, the electrical picture signal is transmitted to a remote location through transmitting facilities such as common carrier channels, co-axial cables or microwave relay equipment and is translated into a facsimile of the original document by applying the signal to a cathode ray tube in the optical system of a xerographic reproducing machine.

The increasing need for facsimile reproductions at remote locations has inspired a variety of different approaches to the inherent problems of translating an original document into an electrical signal and reproducing that signal into a facsimile of the original document. Although there are many approaches to the problem which are operable and there are a number of commercial systems available, each have distinctive problems and inherently undesirable characteristics. Many of the scanning and reproducing methods are slow and relatively inefficient. The quality of the image reproduced is usually inferior to that of the original document. Most reproduction systems require a specially treated paper and usually require an electrical arcing device or electrical current flow, to mark paper or cause chemical changes to develop photographic images on paper. These methods are either very slow or produce poor quality images.

It is, therefore, an object of this invention to improve facsimile reproduction systems so that an original document is scanned at a relatively high rate of speed with good resolution and a high quality facsimile of an original document is reproduced.

It is a further object of this invention to improve facsimile reproduction systems so that ordinary paper may be used as the reproducing medium.

It is a further object of this invention to improve facsimile reproduction systems so that high quality images may be provided at various speeds found desirable for particular applications.

It is also an object of this invention to improve facsimile reproduction systems to eliminate chemical treatment of the reproduced images and to eliminate specially treated paper or electrical arcing devices to produce the facsimile image.

These and other objects of the invention are obtained by means of a cathode ray tube positioned to scan a moving document with a light spot, a photomultiplier adapted to translate reflections from the document into electrical signals and a cathode ray tube, at a remote location, adapted to receive electrical signals and to expose the photoconductive surface on an automatic xerographic machine.

For a better understanding of the invention, as well as other objects and further features thereof, reference is had to the following detailed description of the invention to be read in connection with the accompanying drawings wherein.

Figure 1:
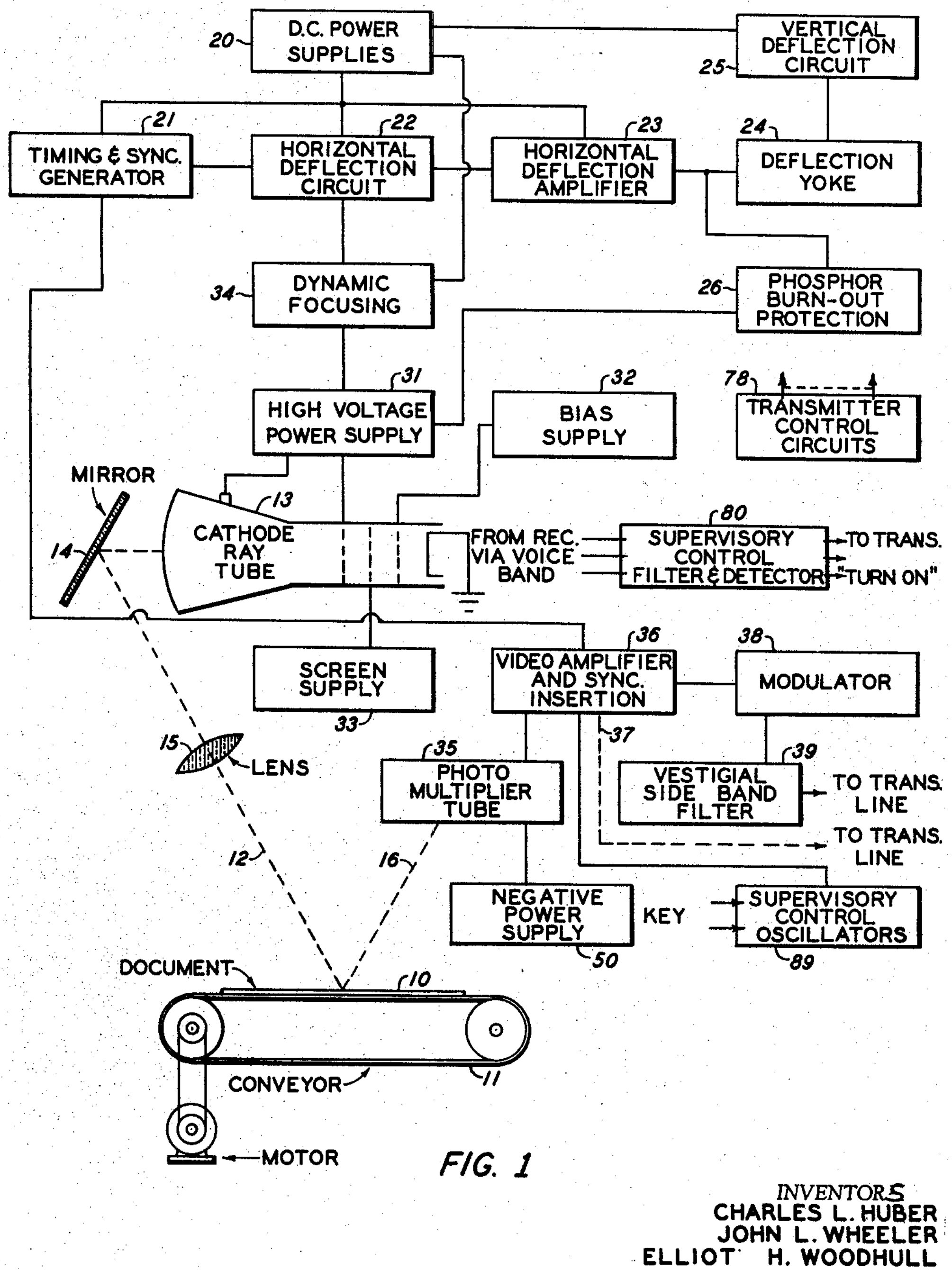
FIG. 1 is a schematic representation of a scanning and transmitting unit.

In FIG. 1, there is shown a schematic representation of one embodiment of a facsimile scanning and transmitting unit. A document 10 is moved through a predetermined path, at a fixed speed, by a conveyor 11. Document 10 is scanned by light beam 12, in a direction perpendicular to the movement of conveyor 11, light beam 12 originates in cathode ray tube 13 and is reflected off a mirror 14 through a lens 15 onto a surface of the document 10.

A direct current power supply 20, wherein normal line voltage is converted to various levels of D.C. voltage, supplies power to a timing and sync generator 21, a horizontal deflection circuit 22, a vertical deflection circuit 25, a deflection amplifier 23 and a dynamic focusing circuit 34. There are additional power supplies such as the negative supply 50 to the photomultiplier tube, the screen supply 33, the high voltage supply 31 and bias supply 32 to the cathode ray tube. For purposes of illustration, these power supplies are shown individually although it is obvious that they may be supplied from a suitable main power supply or individual power supplies, as desired. A timing and sync generator 21 emits a pulse which regulates the operation of the horizontal deflection circuit 22, and a sync burst which is subsequently inserted into the video signal for transmission to the receiving unit. The signal output of the horizontal deflection circuit 22 is amplified by deflection amplifier 23 and fed to the deflection yoke 24 of the cathode ray tube 13. A vertical deflection circuit 25 is provided to control the vertical location of the light spot in the cathode ray tube 13. The light spot is not normally deflected in a vertical direction and the cathode ray tube could be operated without the vertical deflection circuit. However, the vertical deflection is provided to allow the light spot to be moved up or down on the face of the cathode ray tube and thus vary the location of the scan line on the tube face. After a period of operation the phosphor on the tube face wears out, from repeated use, along the scan line. The operator may adjust the vertical deflection, thus producing a new scan line on the tube face, and physically move the tube in the opposite direction to maintain the scan line in the same relative position with respect to the document to be scanned.

Phosphor burn-out protection is also provided at 26 between the deflection yoke 24 and the high voltage supply 31. The function of the phosphor burn-out protection is to insure the high voltage supply 31 will be cut off from the cathode ray tube if, for any reason, the sweep of the light spot fails. Thus, rather than having one bright spot on the tube face, that could burn out the phosphor, the power producing the spot is cut off protecting the phosphor.

A high voltage source 31 supplies direct current at controlled voltages to the tube anode and the focusing electrode of the cathode ray tube 13. There is also a bias voltage supply 32 and a screen voltage supply 33 connected to the control grid and screen grid, respectively. The function of these power supplies is well known in the art and does not require explanation herein. However, a dynamic focusing circuit 34, is provided between the deflection circuit 22 and the high voltage power supply 31. This circuit provides an automatic focusing adjustment of the light spot on the cathode ray tube face so that the spot size is uniform throughout the entire scan. The spot of light generated by the phosphor would normally vary between the center of a scan and the ends of a scan due to the greater distance traveled by the electron stream to the ends of the scan. The dynamic focusing circuit applies corrective measures to the focusing electrode in response to the deflection signal from the deflection circuit 22. Specifically, the dynamic focusing circuit integrates the saw tooth wave form from the horizontal deflection circuit 22 and generates a parabolic wave form in time synchronization with the sweep. The parabolic wave form is added to the D.C. voltage supplied to the focusing grid in the high voltage supply 31 to maintain spot size uniformity across the face of the cathode ray tube.

When the light beam 12 scans document 10, light is reflected from the white or light colored areas of the document along path 16 to a photomultiplier 35. When the light beam 12 falls on dark areas on the document there is no reflection, or the reflection is so low that it does not affect the photomultiplier 35. The photomultiplier translates the reflected light from the document into an electrical signal which is amplified by the video amplifier 36. The video amplifier 36 also receives a sync burst from the timing and sync generator 21 and inserts the sync burst into the video signal from the photomultiplier 35. The composite signal is then either sent directly to the receiving unit, as indicated by the dotted line 37, or sent to modulator 38. The modulator 38 introduces a carrier signal to the composite video and sync signal. A vestigial side band filter 39 is placed on the output of the modulator 38. The function of this filter to reduce band width requirements is well known in the art and does not require explanation herein.

The transmission facilities between the transmitter and receiver do not constitute part of this invention, but, for purposes of understanding the invention, are discussed briefly herein. The invention disclosed is suitable for transmitting signals by any of the common carriers available or by individually owned microwave or co-axial cable. For short distance transmission, a direct connection using shielded twisted wires or co-axial cable, between the transmitter and receiver is satisfactory. This distance may be extended by using amplifiers appropriately placed along the length of the cable. The common carriers provide suitable communication facilities for use over extended distances. As pointed out above, this invention supplies the signal to the common carrier or to the input of the individual's own transmission facilities and picks up the transmitted signal at the receiving unit.

Figure 2:
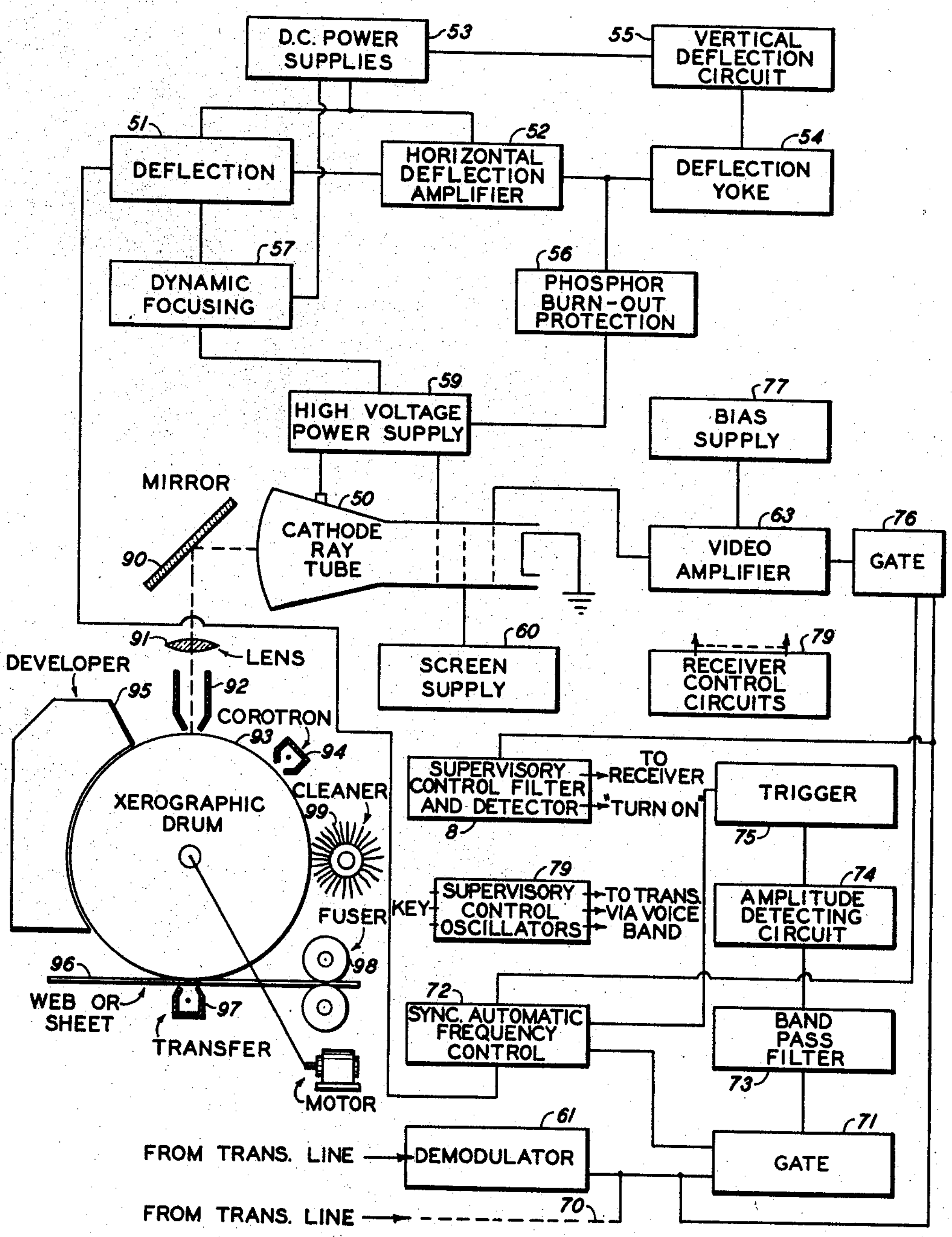
FIG. 2 is a schematic representation of a receiving and recording unit.

The cathode ray tube 50, used in the receiving and recording or print-out unit shown in FIG. 2, operates in much the same way as the cathode ray tube of the scanning unit shown in FIG. 1. The cathode ray tube 50 has a horizontal deflection circuit 51 and a horizontal deflection amplifier 52 operated by a direct current power source 53. The output signal of the deflection amplifier 52 is fed to the deflection yoke 54 and controls the horizontal scan of cathode ray tube 50. The scan of the light spot from the cathode ray tube 50 is the same type of single line horizontal scan as in the transmitting unit. To permit vertical positioning of the spot, a vertical deflection circuit 55 supplies a signal to the deflection yoke 54 controlling the vertical location of the light spot and scan line in tube 50. There is phosphor burn out protection 56 and a dynamic focusing circuit 57 that function in the same manner as previously described for the transmitting unit. Also a high voltage supply 59 supplies voltage to the tube anode and to the focusing electrode. Likewise, screen supply 60 controls the potential on the screen grid.

The signal from the transmitting unit is demodulated at the receiving unit in demodulator 61 producing an output signal containing the video signal and the sync signal. Alternatively, if a composite signal is transmitted from the video amplifier 36 bypassing the modulator 38, then the incoming signal, at the receiving unit bypasses the demodulator 61, as shown by the dotted line 70.

The composite video and sync signal from the demodulator 61, or from line 70 bypassing the demodulator 61, is fed through gate 71 wherein it is gated according to a signal received from a sync automatic frequency control 72. Gate 71 reacts to the signal from sync AFC 72 to anticipate the sync signal in the composite video and sync signal and permits passage of the sync signal only. This prevents a video signal of the same general characteristic as the sync signal, which might be interpreted at the receiver as a sync signal, from erroneously actuating the deflection circuit of the cathode ray tube. It is possible that a certain configuration of the copy being reproduced could produce a video signal resembling the sync signal and thus interfere with the operation of the receiver. The sync burst from gate 71 is fed through a band pass filter 73 wherein the wave form of the sync burst is changed to a sinusoidal wave form of increasing and decreasing amplitude. The band pass filter 73 is tuned to the stable clock in the timing and sync generator 21 of the transmitting unit. This is actually tuned to the sync signal which is derived from the stable clock. The sinusoidal wave form is fed to an amplitude detecting circuit 74, which emits a signal constituting the envelope of the sinusoidal wave form, which in turn actuates a triggering device 75 to produce a raw sync pulse when a predetermined amplitude level of the signal from the detection circuit 74 is exceeded.

The unstable raw sync pulse from triggering device 75 is fed to the sync automatic frequency control 72 which produces an output of regenerated stable sync pulses. Another signal from the sync AFC 72 is used to operate gate 71 to anticipate the incoming sync burst in the composite video and sync signal. The regenerated stable sync pulse is fed from the sync automatic frequency control 72 to the horizontal deflection circuit 51 to provide proper timing for the horizontal deflection circuit so that the sweep of the spot in cathode ray tube 50 is synchronized with the sweep of the spot in the transmitter cathode ray tube 13. The sync information, which consists of tone bursts at the proper time in the scan period, is separated by means of a band pass filter 73 followed by an amplitude detecting circuit 74. The resulting raw sync pulse has its theoretical trailing edge at $t_0$, the ideal time for beginning of receiver scan sweep. The actual timing of the raw sync pulse, however, varies considerably because of random and impulse noise voltages, inserted by the communication link, added to the signal voltage and causing the output of the sync separation circuit to trigger at times relative to $t_0$ which vary from scan to scan; and frequency distortion in the communication link which causes some of the video information to shift over into the sync time interval. The frequency distortion, causes shifts in the raw sync pulse timing relative to $t_0$ which vary with the image being scanned and transmitted. The function of the sync AFC unit is to produce a stable sync pulse signal which has a trailing edge that varies from $t_0$ by a smaller time difference than that of the raw sync pulse signal.

The composite video and sync signal is taken from ahead of the gate 71 to a second gate 76 which is actuated by an inverted sync pulse from sync AFC 72 to anticipate the video portion of the composite video and sync signal, thus blanking out the sync bursts. The video signal is permitted to pass gate 76 to video amplifier 63. Video amplifier 63 controls the bias supply 77 according to the incoming signals from gate 76. Bias supply 77 supplies potential to the control grid of the cathode ray tube 50 controlling the brightness of the scan spot. The video amplifier 63 controls the spot brightness so that it is modulated in response to the information emitted by the transmitter in the form of a video signal.

Both the transmitter and the receiver contain the necessary control circuits as illustrated at 78 in FIG. 1 and 79 in FIG. 2. These control circuits perform the necessary functions of placing the individual unit into an on, standby or ready orientation. For example, in the transmitter the unit must be switched on providing power to the various power supplies and assuring that all necessary interlock switches are actuated and then, prior to going into a standby condition, that there is power to the cathode ray tube filament and that there is adequate warm-up time. The same procedure is also obviously necessary in the receiving unit. It is further necessary that the transmitter and the receiver be capable of communicating to provide necessary information such as whether the receiver is in a condition to receive transmission. For these purposes, supervisory control oscillators 89 are provided in the transmitter and supervisory control oscillators 79 are provided in the receiver. Signals are received from the supervisory oscillators 79, in the receiver, at the transmitter by the supervisory control filter and detector 80 and signals from the supervisory control oscillators 89, in the transmitter, are received by the supervisory control filter and detector 81 in the receiver. A signal received by supervisory control filter 80 is used to initiate the document feeding operation of the transmitter. The receiver operation may be actuated either by receipt of a supervisory control signal in filter 81 or by detection of received sync signals in the composite signal in the amplitude detecting circuit 74. The communications between the transmitter and the receiver, by the supervisory control oscillators and filters and detectors, may be transmitted over the same channel by means of multiplexing equipment or over separate channels. The circuitry may be designed to transmit and receive any number of control operations desired, for example, a separate oscillator may provide notification from the transmitter that the end of transmission, or the end of a page has been reached and this signal may be utilized by the receiver through its supervisory control filter and detector 81 to actuate a paper cutter.

In the receiving unit, the video amplifier 63 controls the bias supply 77 to produce an on or off condition of the light spot of cathode ray tube 50, as the light spot sweeps across the end of tube 50, in synchronization with the original sweep of light by the transmitter cathode ray tube 13. The light spot is reflected by a mirror 90 through a lens 91 and a light shield 92 onto the surface of a xerographic drum 93. The xerographic drum 93 contains a photoconductive surface which has the ability of retaining an electrostatic charge on the surface when the surface is kept in darkness and of discharging the electrostatic charge through to a conductive base beneath the photoconductive surface when the drum surface is exposed to light. Photoconductive materials, such as for example, selenium, have the characteristic of being an insulator in darkness and a conductor when exposed to light. Thus, when the xerographic drum 93 is shielded from outside light and an electrostatic charge is placed on the surface by corotron 94 a latent electrostatic image is generated on the surface of the drum by the sweep of the light spot from cathode ray tube 50 through lens 91. As the light spot sweeps longitudinally across the drum surface, the electrostatic charge on the drum surface is discharged at the points that the light spot is on in response to the signal received by the video amplifier 63, and the drum surface retains the electrostatic charge at the points that light spot is off. The drum 93 is rotated at a speed which provides linear movements of its surface in synchronization with the linear movement of the document 10 on conveyor 11 of the transmitter. Thus, each sweep of light from the cathode ray tube 13 in the transmitter across the surface of document 10 corresponds to the same sweep of light from cathode ray tube 50 across the drum surface 93 and the same linear distance between sweeps on the document and the drum surface is maintained.

The latent electrostatic image on the drum 93 moves as the drum is rotated through a developer apparatus 95 which applies an appropriately charged toner or developer powder to the surface of the drum. The powder adheres to the areas of the drum surface which have been discharged by the cathode ray tube exposure and does not adhere to areas of the surface which contain the initial electrostatic charge. Thus, there is developed a powder image of the original document 10 on the surface of the drum 93. The drum continues to rotate so that the powder image is brought into surface contact with a web or sheet of material 96, usually paper. The powder image is transferred to the web 96 by applying an electrostatic charge to the underside of the web by corotron 97. The electrostatic charge from corotron 97 attracts the powder from the surface of the drum 93 onto the web 96. The web 96 is then passed through a fusing device 98, herein shown as heated pressure rolls, but which may be any suitable fusing device, such as an electric heater or a vapor fuser, both commonly known in the art of xerography. The drum continues to rotate past a cleaning brush 99 which removes any residual powder left on the drum surface. The drum is then ready to receive another electrostatic charge from corotron 94 and a new image from the cathode ray tube 50. It is obvious that this is a continuous process and that while an image is being developed, transferred and fused, a new image may be placed on the drum surface. The particular type of charging, developing, transferring, fusing and cleaning shown herein is for illustration purposes only. It is obvious that any of these may be suitably replaced by other well-known xerographic techniques.

While the present invention, as to its objects and advantages, as described herein, has been carried out in a specific embodiment thereof, it is not desired to be limited thereby but it is intended to cover the invention broadly within the spirit and scope of the appended claims.

What is claimed is:

1. A facsimile transmitting and receiving system comprising a transmitter for translating an original document into electrical signals suitable for transmission to remote locations including, a document conveyor for moving a document past a fixed position, a first cathode ray tube positioned to sweep a light spot across the surface of a document on said conveyor in a direction perpendicular to the direction of movement of the conveyor, circuit means to control the sweep, size and intensity of said light spot, a photomultiplier for receiving reflected light from a document on said conveyor and to translate the reflected light into a first electrical signal, said circuit means including a timing device and sync signal generator which produces a second electrical signal in timed relation to the sweep of said light spot, and means to insert second signal into said first electrical signal;

a receiver which receives signals from the transmitter and produces a facsimile of a document in the transmitter in response to the signals including means to separate a signal from the transmitter into two components consisting of said first electrical signal and said second electrical signal, a second cathode ray tube, a horizontal deflection circuit to control the sweep of a light spot in said second cathode ray tube in response to said second signal so that the sweep of said second cathode ray tube is synchronized with the sweep of said first cathode ray tube, means to control illumination of said light spot in response to said first electrical signal, a xerographic drum positioned for rotational movement so that the light spot from said second cathode ray tube sweeps longitudinally across the surface thereof and produces an electrostatic image thereon, drive means to rotate said drum so that the linear speed of the drum surface is the same as the linear speed of a document on said conveyor,
means to apply an electrostatic charge on the surface of said xerographic drum prior to said surface being exposed to said light spot,
means to develop a powder image of the electrostatic image produced on said xerographic drum created by the light spot from the second cathode ray tube,
and means to transfer said powder image to a support material surface,
and control circuits in the transmitting and receiving units to regulate operation of the transmitter and receiver including
a first supervisory control oscillator in the transmitter for sending control signals to the receiver,
a second supervisory control oscillator in the receiver for sending control signals to the transmitter,
a first supervisory control filter and detector in the receiver for receiving signals from the first supervisory control oscillator and regulating operation of the receiver,
and a second supervisory control filter and detector in the transmitter for receiving signals from the second supervisory control oscillator and regulating operation of the transmitter.

2. A facsimile transmitting and receiving system comprising
a transmitter for translating an original document into electrical signals suitable for transmission to remote locations including,
a document conveyor for moving a document past a fixed position,
a first cathode ray tube positioned to sweep a light spot across the surface of a document on said conveyor in a direction perpendicular to the direction of movement of the conveyor,
circuit means to control the sweep, size and intensity of said light spot,
a photomultiplier for receiving reflected light from a document on said conveyor and to translate the reflected light into a first electrical signal,
said circuit means including a timing device and sync signal generator which produces a second electrical signal in timed relation to the sweep of said light spot,
and means to insert said second signal into said first electrical signal;
a receiver which receives signals from the transmitter and produces a facsimile of a document in the transmitter in response to the signals including
means to separate a signal from the transmitter into two components consisting of said first electrical signal and said second electrical signal,
a second cathode ray tube,
a horizontal deflection circuit to control the sweep of a light spot in said second cathode ray tube in response to said second signal so that the sweep of said second cathode ray tube is synchronized with the sweep of said first cathode ray tube,
means to control illumination of said light spot in response to said first electrical signal,
a xerographic drum positioned for rotational movement so that the light spot from said second cathode ray tube sweeps longitudinally across the surface thereof and produces an electrostatic image thereon,
drive means to rotate said drum so that the linear speed of the drum surface is the same as the linear speed of a document on said conveyor,
means to apply an electrostatic charge on the surface of said xerographic drum prior to said surface being exposed to said light spot,
means to develop a powder image of the electrostatic image produced on said xerographic drum created by the light spot from the second cathode ray tube,
and means to transfer said powder image to a support material surface,
and control circuits in the transmitting and receiving units to regulate operation of the transmitter and receiver including
a first supervisory control oscillator in the transmitter for sending control signals to the receiver,
a second supervisory control oscillator in the receiver for sending control signals to the transmitter,
a first supervisory control filter and detector in the receiver for receiving signals from the first supervisory control oscillator and regulating operation of the receiver,
and a second supervisory control filter and detector in the transmitter for receiving signals from the second supervisory control oscillator and regulating operation of the transmitter,
said receiver also including a sync automatic frequency control circuit which receives unstable raw sync pulses and generates stable sync pulses to control the scan of said second cathode ray tube and a gate controlled by a signal from the automatic frequency control circuit to anticipate the sync signal in the composite signal received from said transmitter thereby blanking out the video signal from the signal passed to the sync automatic frequency control and preventing video signals of the same general characteristics as the sync signals from effecting the timing of the cathode ray tube scan.

References Cited in the file of this patent

UNITED STATES PATENTS 2,747,015 Ridings ---------------- May 22, 1956
3,099,710 Moller ---------------- July 30, 1963